July 31, 1962   A. C. H. BORSBOOM   3,047,797
MEASURING CONDUCTIVITY OF LIQUIDS
Filed June 29, 1959                                2 Sheets-Sheet 1

INVENTOR:
ALBERTUS C. H. BORSBOOM
BY: Theodore E. Bieber
HIS ATTORNEY

INVENTOR:
ALBERTUS C. H. BORSBOOM
BY Theodore E. Bieber
HIS ATTORNEY

United States Patent Office 3,047,797
Patented July 31, 1962

3,047,797
MEASURING CONDUCTIVITY OF LIQUIDS
Albertus C. H. Borsboom, Amsterdam, Netherlands, assignor to Shell Oil Company, a corporation of Delaware
Filed June 29, 1959, Ser. No. 823,376
Claims priority, application Netherlands July 23, 1958
4 Claims. (Cl. 324—30)

This invention pertains to an instrument for determining the electrical conductivity of liquids, more particularly the conductivity of liquids having high specific resistance.

The instrument of this invention is particularly useful in determining the conductivity of organic liquids such as hydrocarbons and especially hydrocarbons to which is added substances known as dopes for increasing their electrical conductivity. Specifically, resistance of such liquids is in the general range of about $10^{10}$ to $10^{15}$ ohms centimeters. Substances are added to hydrocarbons for increasing their conductivity in order to reduce the danger from static electricity which can cause sparks and the like and thus ignite the hydrocarbon mixture. While in general the liquids are non-aqueous liquids it is possible for the liquids to contain a quantity of dissolved, suspended or emulsified water.

In the past it has been customary to measure the conductivity of such liquids by use of a measuring cell, a direct current voltage source and an electrical measuring instrument for determining the current flow through measuring cell. While this equipment is satisfactory its use is limited solely to laboratories due to the delicate construction of the measuring instrument. The small magnitude of the current flow in the measuring cell necessitates the use of very sensitive measuring instruments in order to achieve accuracy and thus limits the use of these devices to laboratories and the like.

Accordingly, it is the principal object of this invention to provide a novel instrument which is extremely portable and can be used anywhere including storage vessels to measure the conductivity of a liquid.

It is a further object of this invention to provide an instrument for measuring the conductivity of a liquid which includes a measuring cell and a voltage amplifier with a novel means for correcting for the normal drift of a voltage amplifier, thus increasing the accuracy of the instrument.

The above objects and advantages of this invention are achieved by providing a measuring cell having a pair of spaced electrodes with a shield or guard electrode disposed therebetween. A source of direct current is coupled to the spaced electrodes of the cell and the current flow between the electrodes is amplified by a voltage amplifier, more particularly, an operational or direct current type of amplifier. The output voltage of the amplifier is measured and knowing this voltage as well as the feedback resistance of the amplifier plus the magnitude of the voltage coupled to the measuring cell one can easily calculate the resistance of the liquid in which the measuring cell is immersed. As is well known by those skilled in the art, operational amplifiers are subject to considerable drift which means that for a zero input signal the output does not always correspond to zero. Thus, if one is to make accurate measurements some means must be provided for correcting for the normal drift of the amplifier. This invention provides such compensation by utilizing a memory device which stores the compensating signal for delivery to the amplifier during the measuring cycle. The compensating signal is derived by decoupling the measuring cell from the amplifier and feeding the output signal of the amplifier back to the amplifier input for temporary storage in the memory element. The memory element may take various forms, a capacitor being particularly useful for this purpose. After the compensating signal has been stored in the memory device the instrument is shifted to a measuring position in which position the capacitor is disposed in series with the measuring cell and thus corrects for the normal drift of the amplifier.

The above objects and advantages of this invention will be more easily understood by those skilled in the art from the following description of a preferred embodiment when taken in conjunction with the attached drawings in which.

Figure 1:
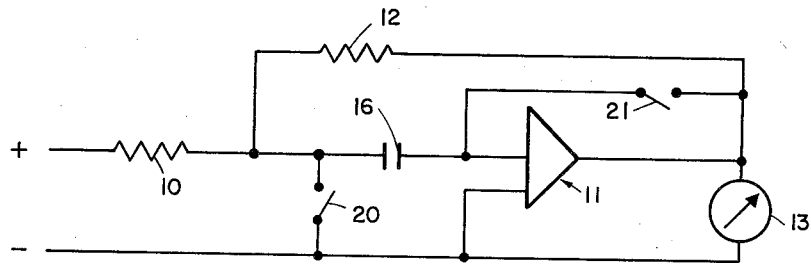
FIGURE 1 is a simplified circuit showing the principal operation of this invention.

Referring to FIGURE 1, there is shown a resistance 10 which represents the unknown resistance of a liquid whose magnitude is desired. The resistance 10 is coupled in series with a capacitor 16 and to the input side of a voltage or operational amplifier 11. A second resistance 12 is disposed in a feedback loop of the amplifier 11 and has a high ohmic value which has the same order of magnitude as the lowest value of the unknown resistor 10. Switch 20 is disposed so that the resistances 10 and 12 may be decoupled from the input side of the amplifier 11. A switch 21 is disposed so that the output of the amplifier may be fed back directly to the input. A measuring instrument 13 such as a microammeter is disposed to measure the output voltage of the amplifier. A suitable source of direct current potential not shown in FIGURE 1 is connected to the resistance 10 and through it to the voltage amplifier 11.

When it is desired to correct the amplifier 11 for drift the switches 20 and 21 are closed. In this position the output voltage of the amplifier will be equal to the input voltage and the capacitor 16 will be charged to this voltage. To measure the unknown resistance 10 the switches 20 and 21 are open thus connecting the resistance 10 in series with the amplifier 11 and the resistance 12 in the feedback loop of the amplifier. If the amplifier 11 is provided with a high enough amplification factor, on the order of 100, the voltage on the capacitor 16 will be substantially the same as the drift voltage on the amplifier. The net result will be that the drift voltage is reduced by a factor of the amplification of the amplifier plus 1. After the switches 20 and 21 are open the initial or instantaneous value of the output voltage is read on microammeter 13 and recorded. Utilizing this reading one may calculate the unknown resistance from the following formula:

$$\frac{V_1}{R_{10}} = \frac{V_2}{R_{12}}$$

in which formula $V_1$ is equal to the magnitude of the potential applied to the resistance 10 and $V_2$ is equal to the output voltage of the amplifier as measured by the microammeter 13. The initial reading of the microammeter is used as the voltage $V_2$ since the conductivity of most hydrocarbon liquids decreases considerably with time. It has been found that more accurate results are obtained for the resistance of the liquids if the instantaneous value is used.

Figure 2:
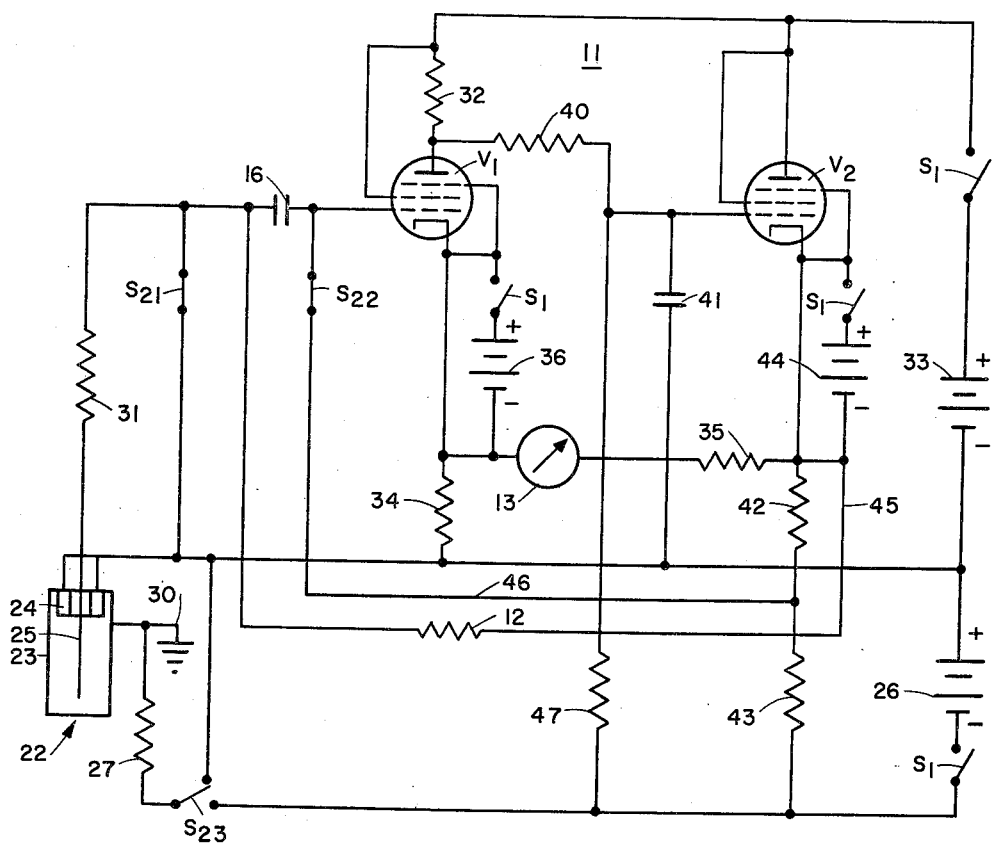
FIGURE 2 is a detailed schematic drawing of the circuit of this invention.

Referring now to FIGURE 2, there is shown a detailed circuit for the operational amplifier and drift correcting circuit of FIGURE 1. The measuring cell 22 consists of an outer electrode 23, a guard electrode 24 and a center electrode 25. The outer electrode 23 is coupled to the negative side of a battery 26 through a resistance 27. The negative side of the battery is also grounded at 30 thus the outer electrode is maintained at ground potential. The guard electrode 24 is connected to the positive side of the battery 26 and thus it is at substantially the same potential as the central electrode 25 which is coupled to the amplifier. The detailed construction of the measuring cell 22 will be explained more fully below with reference to FIGURE 3.

The central electrode 25 is coupled to the input grid of the vacuum tube $V_1$ through a resistance 31. The compensating or memory capacitor 16 is disposed in series with the connection between the electrode 25 and the grid of the tube $V_1$. The plate of the tube $V_1$ is coupled to the positive side of a battery 33 through a plate resistance 32 while the cathode is coupled to the negative side of battery 33 through a resistance 34. An additional battery 36 is coupled to the cathode of the tube $V_1$ for supplying the necessary filament voltage. The output of the tube $V_1$ is coupled to the grid of the tube $V_2$ through a voltage divider consisting of resistances 40 and 49 with a decoupling capacitor 41 being disposed in parallel therewith. The plate of the tube $V_2$ is coupled directly to the battery 33 while an additional battery 44 is provided for supplying the filament voltage of the tube $V_2$. The cathode of the tube $V_2$ is coupled to the cathode of the tube $V_1$ through a resistance 35 and the microammeter 13. The cathode of the tube $V_2$ is coupled to the negative feedback loop of the amplifier by means of a lead 45 containing the high ohmic resistance 12. Likewise, a small amount of positive feedback is provided for the amplifier by means of resistance 34. A voltage divider composed of resistances 42 and 43 which is disposed between the cathode of the tube $V_2$ and the ground 30 supplies the negative bias voltage to the grid of tube $V_1$ via lead 46.

From the above description it can be appreciated that the operational amplifier is a two-stage amplifier with the second stage being disposed in a cathode follower relationship. The first stage is disposed as an electrometer pentode which insures that the amplifier will be a very small load on the measuring cell 22 and thus improve the accuracy of the device.

As shown in FIGURE 2, a plurality of switches $S_1$ are disposed for coupling and decoupling the various batteries 26, 33, 36 and 44 in the circuit. These switches should be disposed to be operated by a single control when it is desired to energize the amplifier. A second plurality of switches $S_{21}$, $S_{22}$ and $S_{23}$ are disposed to couple the amplifier in a rest or drift correcting position and in a measuring position. The switches as shown in FIGURE 2 are disposed in a position to couple the amplifier in a drift correcting position. In this position the switches $S_{21}$, $S_{22}$ are closed and the switch $S_{23}$ connects the electrode 23 of the cell via resistance 27 to the positive side of battery 26 and thus prevents that any current flows in the cell. The output of the second stage is supplied through the voltage divider 42 and 43 and lead 46 to the compensating capacitor 16. When th switchese $S_{21}$ and $S_{22}$ are open and the switch $S_{23}$ is put in the other position the compensating circuit will be decoupled from the capacitor 16 and the cell 22 will be coupled in series with the capacitor 16, battery 26 and the input stage of the amplifier 11. In this position the initial value of the output voltage is read on the microammeter 13. From the above description it can be appreciated that it is desirable to have the switches $S_{21}$, $S_{22}$ and $S_{23}$ connected together so that they may be operated as a group. Further, it is desirable that they be connected to a button so that when the button is depressed the switches $S_{21}$ and $S_{22}$ are open and the switch $S_{23}$ is in the upper position. Of course, to achieve this type of operation $S_{21}$ and $S_{22}$ must be normally closed switches. Thus, the instrument will be maintained in a compensated condition ready for use in measuring the resistance of a liquid.

Figure 3:
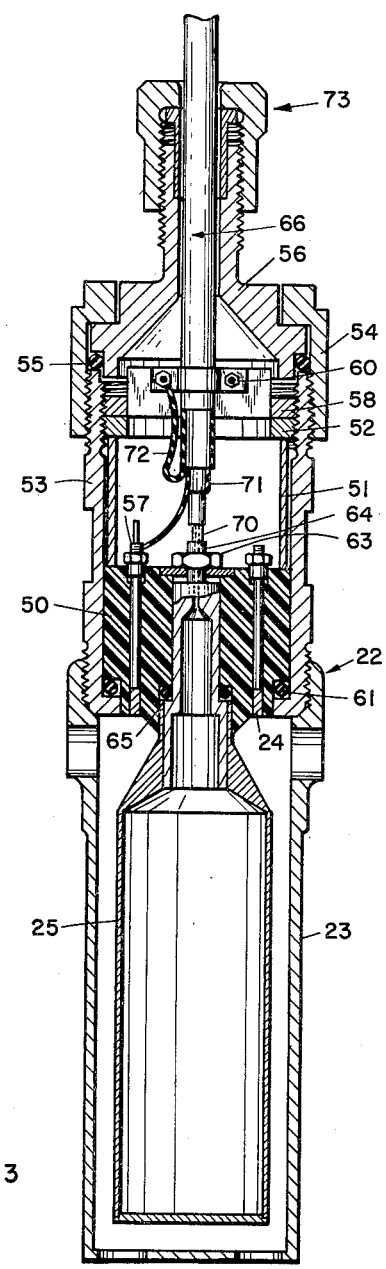
FIGURE 3 is a vertical section of a measuring cell constructed in accordance with this invention.

Referring now to FIGURE 3, there is shown the detailed construction of the measuring cell 22. The two electrodes 23 and 25 are preferably tubular in form and spaced a small distance apart, i.e., on the order of a fraction of an inch. The electrode 25 is completely closed while the electrode 23 is provided with openings in its bottom wall and side wall to permit the liquid to enter the space between the two electrodes. The tubes may be formed of any suitable electrical conducting material such as brass, aluminum or the like. The two electrodes are spaced apart by means of a spacing ring 50 formed from a suitable insulating material such as molded plastic or the like. The guard or shield electrode 24 is disposed in the bottom of the spacer 50 and connected to terminals 57. The outer electrode 23 threads on to the lower end of an intermediate housing 53, whose upper end is closed by an end cap 56 secured to housing 53 by a sleeve 54 which threads onto the upper end of the housing 53. An O-ring 55 is disposed between the end cap 56 and the end of the housing 53 to insure a tight seal. The spacer 50 is forced against an inwardly projecting flange on the bottom of housing 53 by a tubular spacer 51 and a nut 52 which threads into the upper end of the housing 53. A second nut 58 which carries the terminals 60 for the outer electrode is also threaded into the upper end of the housing 53. An O-ring 61 is used to seal the joint between the spacer 50 and the flange on the outer housing 53. The central electrode 25 is secured to the spacer 50 by a nut 63 which threads over a stud 64 projecting from the top of the electrode. A conductor 66 passes through the center of the end cap 56 and consists of a central conductor 70, an intermediate shield 71 and an outer shield 72. The central conductor 70 is connected to the central electrode 25, the intermediate shield 71 is connected to the guard electrode 24 while the outer shield 72 is connected in the outer electrode 23.

The conductor 66 is sealed in the opening in end cap 56 by a conventional packing gland assembly 73.

From the above description it can be appreciated that a measuring cell is provided which can be immersed in a liquid if desired without short circuiting the connections between the various electrodes. The assembly including all electrical connections is completely sealed and thus may be completely immersed. The use of the guard ring 24 insures that any current leakage through the insulating spacer 50 from the outer electrode 23 will stop in the guard ring 24. Thus, the only stray current flowing to the electrode 25 will be the small amount of current flow between the guard ring 24 and the electrode 25. This stray current will be of a very minor nature since the guard ring is substantially the same potential as the center electrode 25.

From the above description it can be seen that a compact instrument for measuring resistance of any liquid, particularly those having a relatively high ohmic value of resistance, has been provided. The accuracy of the instrument is greatly improved over those of prior instruments by including the drift correcting circuit which corrects for the normal drift of the operational amplifier used for measuring the small current flow between the spaced electrodes of the measuring cell. Thus, while but one embodiment of this invention has been disclosed in detail, it should not be limited to the particular details described for purposes of illustration but only to its broad spirit and scope.

I claim as my invention:

1. An instrument for determining the conductivity of a liquid comprising: a measuring cell having a pair of spaced electrodes, said measuring cell disposed to be filled wtih the liquid; a source of direct voltage coupled to said electrodes; an operational amplifier coupled to said electrodes and having a low input current compared to the current flow between said electrodes; a feedback loop for said amplifier containing a large resistance; switch means for decoupling said amplifier from said electrodes, the output voltage of said amplifier when decoupled being stored in a capacitor, said switch means in addition being disposed to selectively recouple said amplifier to said electrodes and in addition couple said capacitor in series with said amplifier and electrodes, said capacitor when disposed in series supplying a drift correcting voltage to the amplifier in addition to the signal voltage from the electrodes and measuring means for determining the initial output signal of the amplifier when said switch means recouples said amplifier to said electrodes.

2. An instrument for determining the conductivity of a liquid comprising: a measuring cell having a pair of spaced electrodes, said measuring cell disposed to be filled with the liquid; a source of direct voltage coupled to said electrodes; an operational amplifier coupled to said electrodes and having a low input current compared to the current flow between said electrodes; a feedback loop for said amplifier containing a large resistance; switch means for decoupling said amplifier from said electrodes, storage means for storing the output of said amplifier when said amplifier is decoupled from said electrodes, said switch means in addition being disposed to selectively recouple said amplifier to said electrodes and in addition couple said storage means in series with said amplifier and electrodes, said storage means when disposed in series supplying a drift correcting voltage to the amplifier in addition to the signal voltage from the electrodes and measuring means for determining the initial output signal of the amplifier when said switch means recouples said amplifier to said electrodes.

3. An instrument for determining the conductivity of a liquid comprising: a measuring cell having a pair of spaced electrodes, a guard electrode disposed between said spaced electrodes and surrounding one of said electrodes, said measuring cell disposed to be filled with the liquid; a source of direct voltage coupled to said electrodes; an operational amplifier coupled to said electrodes and having a low input current compared to the current flow between said electrodes; a feedback loop for said amplifier containing a large resistance; switch means for decoupling said amplifier from said electrodes, the output voltage of said amplifier when decoupled being stored in a capacitor, said switch means in addition being disposed to selectively recouple said amplifier to said electrodes and in addition couple said capacitor in series with said amplifier and electrodes, said capacitor when disposed in series supplying a drift correcting voltage to the amplifier in addition to the signal voltage from the electrodes and measuring means for determining the initial output signal of the amplifier when said switch means recouples said amplifier to said electrodes.

4. An instrument for determining the conductivity of a liquid comprising: a first tubular electrode closed at one end, a partition disposed within said first electrode to divide said first electrode into a first compartment having an open end and a second closed compartment; a second tubular electrode disposed within said first compartment and suspended from said partition; a third electrode disposed between said first and second electrodes; a cable having a central conductor surrounded by two shield conductors, said cable passing through the closed end of said first tubular member and projecting into said second compartment, said central conductor being connected to one of said first and second electrodes and said shield conductors being connected to the other of said first and second electrodes and said third electrode; a source of direct current coupled to said cable and means for measuring the current flow between said first and second electrodes when said first and second electrodes are immersed in a liquid.

References Cited in the file of this patent

UNITED STATES PATENTS

| 2,724,022 | Williams et al. | Nov. 15, 1955 |
| 2,940,287 | Henderson | June 14, 1960 |

FOREIGN PATENTS

| 1,011,936 | France | Apr. 9, 1952 |

OTHER REFERENCES

Cederbaum et al.: Rev. Sci. Instr., vol. 25, No. 8, August 1955; pages 745–747.